(12) United States Patent
Washizawa

(10) Patent No.: US 11,743,405 B2
(45) Date of Patent: Aug. 29, 2023

(54) FLATBED SCANNER AND METHOD FOR PRODUCING SCAN DATA

(71) Applicant: SEIKO EPSON CORPORATION, Tokyo (JP)

(72) Inventor: Aya Washizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/650,869

(22) Filed: Feb. 14, 2022

(65) Prior Publication Data

US 2022/0263967 A1 Aug. 18, 2022

(30) Foreign Application Priority Data

Feb. 15, 2021 (JP) .................. 2021-021503

(51) Int. Cl.
*H04N 1/04* (2006.01)
*H04N 1/028* (2006.01)
*H04N 1/19* (2006.01)
*H04N 1/00* (2006.01)

(52) U.S. Cl.
CPC ......... *H04N 1/028* (2013.01); *H04N 1/00018* (2013.01); *H04N 1/19* (2013.01)

(58) Field of Classification Search
None
See application file for complete search history.

(56) References Cited

U.S. PATENT DOCUMENTS

| 4,561,764 | A   | * | 12/1985 | Sugiura   | G03B 27/527 399/210 |
| 2004/0212851 | A1 | * | 10/2004 | Osakabe   | H04N 1/00681 358/497 |
| 2008/0225355 | A1 | * | 9/2008  | Kagami    | H04N 1/12 358/496 |
| 2010/0053678 | A1 | * | 3/2010  | Yoshihisa | H04N 1/00519 358/1.15 |
| 2013/0243454 | A1 | * | 9/2013  | Ishihara  | G03G 15/6594 399/53 |
| 2015/0273922 | A1 | * | 10/2015 | Horade    | B41J 11/0095 347/19 |
| 2017/0155787 | A1 | * | 6/2017  | Mizude    | H04N 1/00708 |
| 2018/0034991 | A1 | * | 2/2018  | Osada     | H04N 1/3935 |
| 2021/0245979 | A1 | * | 8/2021  | Hamada    | H04N 1/00652 |
| 2022/0263967 | A1 | * | 8/2022  | Washizawa | H04N 1/00018 |

FOREIGN PATENT DOCUMENTS

JP 2013-090258 A 5/2013

* cited by examiner

*Primary Examiner* — Dung D Tran
(74) *Attorney, Agent, or Firm* — Global IP Counselors, LLP

(57) ABSTRACT

A flatbed scanner includes a carriage for reading an original while moving in a first direction; an acquisition portion for acquiring a size of the original in the first direction; and a control portion for reading the original while moving the carriage at a lower speed in a first case where the original is large than in a second case where the original is small.

6 Claims, 3 Drawing Sheets

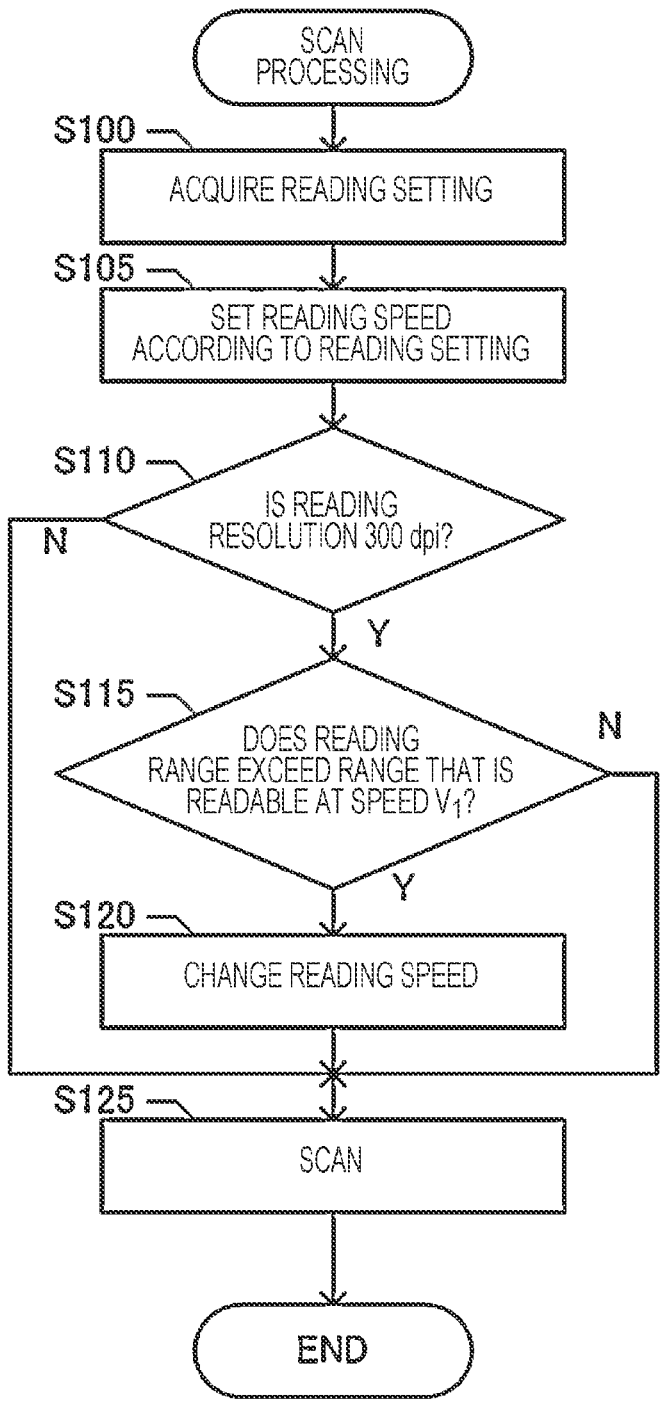

FLATBED SCANNER AND METHOD FOR PRODUCING SCAN DATA

The present application is based on, and claims priority from JP Application Serial Number 2021-021503, filed Feb. 15, 2021, the disclosure of which is hereby incorporated by reference herein in its entirety.

BACKGROUND

1. Technical Field

The present disclosure relates to a flatbed scanner and a method for producing scan data.

2. Related Art

JP-A-2013-90258 describes a method for selectively improving either a reading image quality or a reading speed in a scanner.

However, when the reading speed is increased by increasing a moving speed of a carriage in a flatbed scanner, a long braking distance is required after reading is completed. Meanwhile, it is also necessary to suppress an increase in product size. For that reason, when a small product that can perform reading at a high speed is made, there was a problem that the carriage cannot be fully decelerated after the reading is completed and thus, comes into contact with a housing.

SUMMARY

When a flatbed scanner for achieving the above object is expressed by focusing on a moving speed of a carriage, the flatbed scanner includes a carriage for reading an original while moving in a first direction; an acquisition portion for acquiring a size of the original in the first direction; and a control portion for reading the original while moving the carriage at a lower speed in a first case where the original is large than in a second case where the original is small.

In addition, when a flatbed scanner for achieving the above object is expressed by focusing on a moving time of a carriage, the flatbed scanner includes a carriage for reading an original while moving in a first direction; and a control portion for causing the carriage to read a first original over a first time and causing the carriage to read a second original over a second time, in which the first direction of the first original is A times (A>1) larger than the first direction of the second original, and the first time is a time that exceeds A times the second time.

When a method for producing scan data for achieving the above object is expressed by focusing on a moving speed of a carriage, a flatbed scanner includes a carriage for reading an original while moving in a first direction acquires a size of the original in the first direction; and reads the original while moving the carriage at a lower speed in a first case where the original is large than in a second case where the original is small.

In addition, when a method for producing scan data for achieving the above object is expressed by focusing on a moving time of a carriage, a flatbed scanner including a carriage for reading an original while moving in a first direction causes the carriage to read a first original over a first time and causes the carriage to read a second original over a second time, in which the first direction of the first original is A times (A>1) larger than the first direction of the second original, and the first time is a time that exceeds A times of the second time.

BRIEF DESCRIPTION OF THE DRAWINGS

FIG. 3 is a flowchart of scan processing.

DESCRIPTION OF EXEMPLARY EMBODIMENTS

Here, embodiments of the present disclosure will be described in the following order.
(1) Configuration of Scanner:
(2) Scan Processing:
(3) Other Embodiments:

(1) Configuration of Scanner

Figure 1:
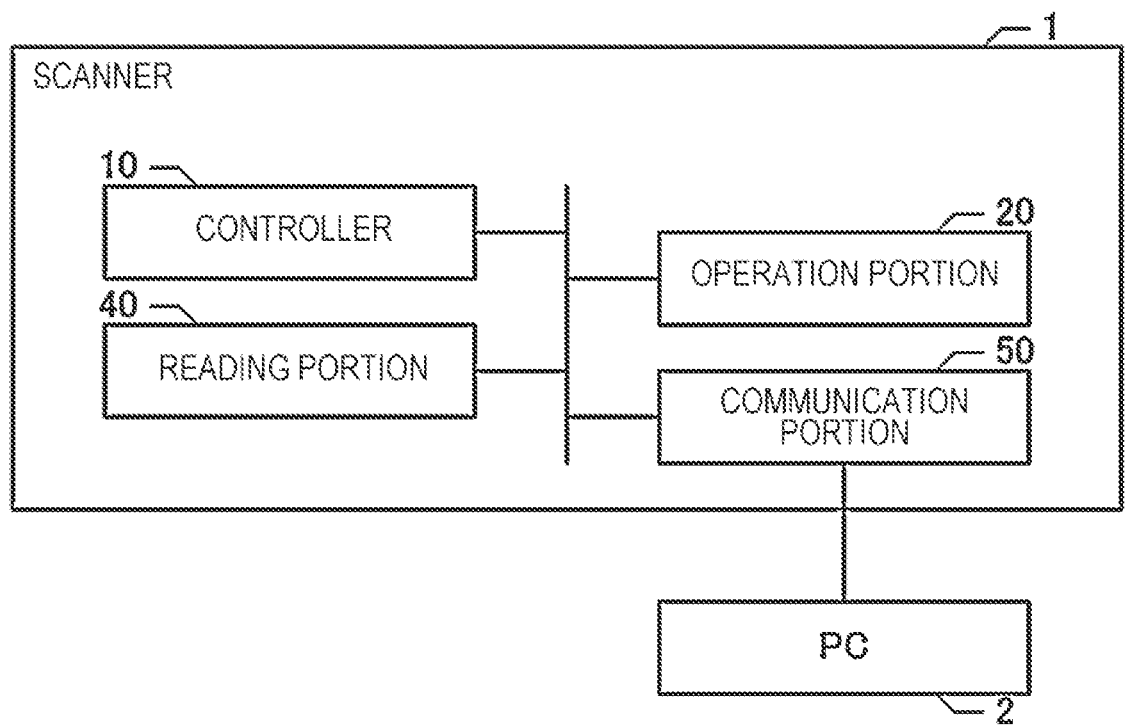
FIG. 1 is a block diagram of a scanner.

FIG. 1 is a block diagram illustrating a configuration of a scanner 1 according to an embodiment of the present disclosure. The scanner 1 is a flatbed scanner that reads an original mounted on an original platen. The scanner 1 includes a controller 10, a reading portion 20, an operation portion 40, and a communication portion 50. The controller 10 includes a well-known processor. Specifically, the controller 10 may be a dedicated circuit such as an application specific integrated circuit (ASIC) whose circuit is configured to execute specific processing, may be a central processing unit (CPU) that reads and executes a program from a recording medium, or may be a system on a chip (SOC). In addition, the SOC, the ASIC, or the like may cooperate with the CPU. The controller 10 controls each portion of the scanner 1, and produces scan data.

Figure 2:
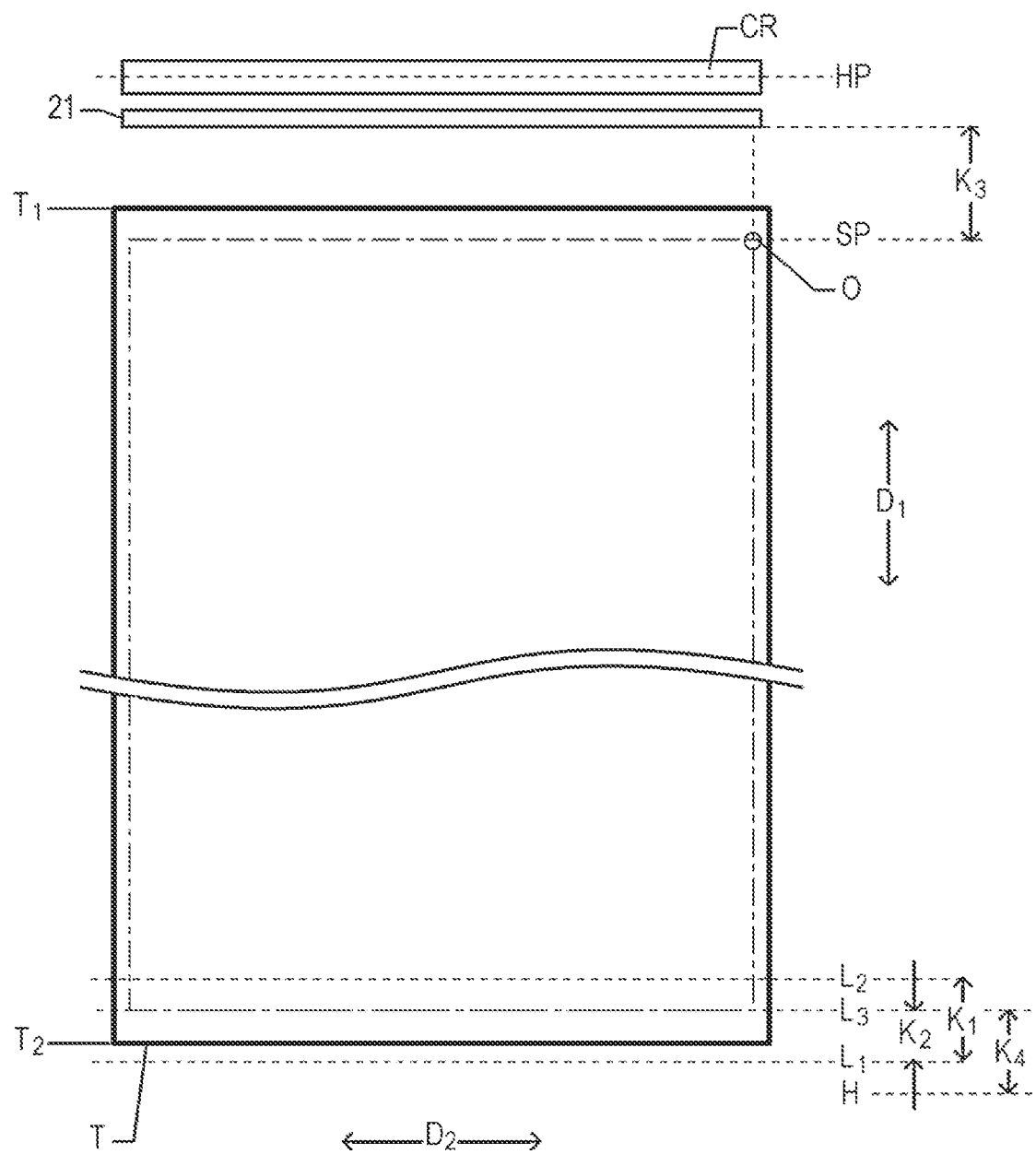
FIG. 2 is a schematic view illustrating an original platen.

FIG. 2 is a schematic view illustrating a reading surface of an original platen T. The original platen T is a transparent plate-shaped member such as glass, and an original is mounted on the original platen T by a user. A housing of the scanner 1 is provided with an original cover (not illustrated) that can be manually opened and closed with respect to the original platen T. The reading portion 20 includes a carriage CR equipped with a light source that irradiates an object to be read, such as an original, with light, an optical system such as a mirror, a lens, and the like, that guides reflected light from the object to be read, an image sensor that reads the object to be read by receiving the guided reflected light and performing photoelectric conversion, and the like.

The carriage CR moves below the original platen T along a first direction $D_1$ in parallel with a surface of the original platen T. The first direction $D_1$ is also referred to as a sub-scanning direction. The image sensor is a line sensor in which a plurality of photoelectric conversion elements are arranged in a second direction $D_2$ which is parallel to the surface of the original platen T and orthogonal to the first direction $D_1$. The second direction $D_2$ is also referred to as a main scanning direction. In the present embodiment, the light source is a white light source. The image sensor includes three columns of photoelectric conversion elements, and each of the photoelectric conversion elements in each column is provided with filters for each color of red (R), green (G), and blue (B). The carriage CR moves along the first direction $D_1$ by a power mechanism (not illustrated) such as a motor or a gear. The controller 10 controls the driving of the power mechanism to move the carriage CR, and causes the image sensor to read the original mounted on the original platen T.

The image sensor has an analog front end (not illustrated). The analog front end includes a circuit that applies a gain to a signal output by the photoelectric conversion element according to the amount of light received and outputs the signal, or a circuit that performs A/D conversion. The analog front end adjusts the gain so that a black level of the image sensor is set to a minimum output value and a white level thereof is set to a maximum output value based on information indicating the gain. The controller 10 acquires the signal as a reading result from the image sensor. The controller 10 performs image processing on the acquired signal to generate scan data which is image data in a default format. The controller 10 can transmit the generated image data (scan data) to an external device (PC 2 in the present embodiment) via the communication portion 50.

The communication portion 50 is a device for communicating with an external device such as a PC 2, and the controller 10 can transmit arbitrary information including the scan data to the PC 2 and can receive various instructions and the like from the PC 2. In the present embodiment, the controller 10 can acquire information indicating reading conditions of the original and a scanning start instruction from the PC 2. The operation portion 40 includes an input portion for receiving operations by the user. The user can also perform an operation such as a scanning start instruction to the operation portion 40. The controller 10 receives an instruction of the user via the operation portion 40.

In the present embodiment, as illustrated in FIG. 2, in the scanner 1, a home position HP is defined in the vicinity of one end $T_1$ in the first direction $D_1$ of the original platen T. The home position HP is a position where the carriage CR stands by when the reading is not performed. A reference plate 21 is arranged in the vicinity of the home position HP. The original platen T is arranged on a side opposite to the home position HP of the carriage CR with the reference plate 21 interposed therebetween. The white level and the black level are determined based on the measurement result of the reference plate 21.

The reference plate 21 has a length similar to that of the carriage CR in the second direction $D_2$. The controller 10 corrects the reading result of the image sensor reading the original based on the white level and the black level.

When the information indicating the reading conditions and the scanning start instruction are acquired from the PC 2, the controller 10 acquires a reading setting required for the reading operation from the information indicating the reading conditions. The information indicating the scanning conditions includes information indicating a color/monochrome selection, an output resolution, and a scanning range on the original platen T, and the like. The output resolution is a resolution specified by the user as the resolution of the scan data that is finally output, and the controller 10 determines a reading resolution according to the output resolution.

In the present embodiment, the image sensor can perform the reading at either a reading resolution of 300 dpi or 600 dpi. The user can select one of several resolutions between, for example, 150 dpi and 600 dpi as the output resolution in the PC 2 and instruct the scanner 1 as the reading condition. The controller 10 selects 300 dpi (second resolution) or 600 dpi (first resolution) as the reading resolution according to the instructed output resolution, and performs the reading. For example, when the output resolution is greater than or equal to a threshold value, 600 dpi is selected, and when the output resolution is less than the threshold value, 300 dpi is selected. In this way, a correspondence between the output resolution and the reading resolution is predetermined. The controller 10 performs resolution conversion processing on the image data generated by reading at 300 dpi or 600 dpi to generate image data having an output resolution specified by the user.

The information indicating the reading range is represented by, for example, a coordinate of the reading start position in the first direction $D_1$, and a distance in the first direction $D_1$ and a distance in the second direction $D_2$ from the reading start position. The scanning start position may be a predetermined reading origin O on a plane of the original platen T, or may be an arbitrary position. A plurality of original size detection sensors (not illustrated) are provided at a plurality of locations below the original platen T, and when an automatic detection of the original size is instructed, the controller 10 can determine the original size or orientation from the output of each sensor and acquire the coordinate indicating the reading range. For example, an optical sensor is used as the original size detection sensor, and it is possible to detect whether or not the original is mounted at an installation position of the sensor. As described above, the controller 10 can acquire the size of the original in the first direction. In this case, the controller 10 functions as an acquisition portion.

Next, an operation of the carriage CR when reading the original will be described. In this example, the description will be continued on the assumption that an end on the $T_1$ side of the reading range is a reading startable position SP which is the reading origin O. A rectangular area indicated by an alternate long and short dash line in FIG. 2 indicates a range that can be read by the image sensor. An end on the $T_1$ side of the readable range is a reading startable position SP, and an end on the $T_2$ side of the readable range is a read limit position $L_3$. In the present embodiment, a maximum size of the original that can be read by the scanner 1 is a legal size. The legal size has a short side that is about 6 mm larger than the short side of the A4 size and a long side that is about 60 mm larger than the long side of the A4 size. In the present embodiment, a length of the first direction $D_1$ of the readable range indicated by the alternate long and short dash line is substantially equal to the length of the long side of the original of the legal size.

Upon receiving the scanning start instruction, the controller 10 moves the carriage CR from the home position HP to the reference plate 21 to read the reference plate 21. Subsequently, the controller 10 accelerates the carriage CR to a predetermined reading speed from the reference plate 21 to the reading startable position SP to causes the image sensor to read while maintaining a constant reading speed from the position of the reading origin O to an edge of the original on the end $T_2$ side in the first direction $D_1$. Since an image quality may be affected when the reading speed (moving speed of the carriage CR) changes during the period of reading the original, the controller 10 moves the carriage CR at a constant speed during the reading period. When the reading to the edge of the original on the end $T_2$ side is completed, the controller 10 decelerates the carriage CR according to a predetermined deceleration procedure according to the characteristics of the motor, and finally stops the carriage CR. A required braking distance from the reading completion position is determined according to the reading speed. When the reading is performed at 300 dpi, it is possible to perform the reading by moving the carriage CR at a higher speed than when the reading is performed at 600 dpi, which is a high resolution. When the reading is performed at 300 dpi, the description will be continued on the assumption that a speed $V_1$ can be adopted as the reading speed.

In FIG. 2, $L_1$ is a position of an end where the carriage CR can move. That is, the carriage CR can move until the carriage CR reaches a movement limit position $L_1$. $L_2$ is a position separated from the end $T_1$ side by a braking distance $K_1$ required for stopping to the movement limit position $L_1$ when the reading resolution is 300 dpi and the reading speed is the speed $V_1$. In other words, the braking distance $K_1$ of the carriage CR when the reading speed is the speed $V_1$ is longer than the distance $K_2$ between an original of a maximum readable size and the movement limit position $L_1$ of the carriage CR. In other words, the distance $K_1$ from the position $L_2$ to the movement limit position $L_1$ is longer than the distance $K_2$ between a reading limit position $L_3$ and the movement limit position $L_1$, which is the end on the $T_2$ side of the readable range (the range of the alternate long and short dash line in FIG. 2).

For that reason, when the reading completion position of the original is on the end $T_1$ side from the position $L_2$, the carriage CR can perform the reading up to the end of the original while moving at a speed of $V_1$, then decelerate and stop at the movement limit position $L_1$ at the latest. In the present embodiment, when an original of an A4 size is mounted so that a long side thereof is parallel to the first direction $D_1$ and is in contact with the reading origin O, a size of the original platen T is designed so that the end on the $T_2$ side is on the $T_1$ side from the position $L_2$. For that reason, in the present embodiment, the original of the A4 size can be read at the speed $V_1$.

When an original of a legal size is mounted on the original platen T so that a long side thereof is parallel to the first direction $D_1$ and is in contact with the reading origin O, the end of the original on the $T_2$ side is the reading limit position $L_3$ on the $T_2$ side from the position $L_2$ in the present embodiment. For that reason, assuming that the carriage CR is moved at a speed of $V_1$ to perform the reading, it is considered that the scanner cannot stop at the movement limit position $L_1$ and comes into contact with a wall of the housing of the scanner 1 when decelerating according to a deceleration procedure. On the other hand, since the life of the motor may be shortened when suddenly decelerating without following the deceleration procedure, the sudden deceleration is not preferable. That is, in the case of the scanner 1, at 300 dpi, which is the second resolution, when the reading is performed at a fixed reading speed $V_1$, there is a problem that the carriage comes into contact with the wall of the housing as described above depending on the size of the original in the first direction $D_1$.

Therefore, in the present embodiment, the controller 10 performs control so that the original is read while the carriage CR is moved at a lower speed in the first case where the original is large than in the second case where the original is small. In this case, the controller 10 functions as a control portion. Specifically, the controller 10 determines the reading resolution from the information indicating the reading conditions acquired from the PC 2. As described above, in the present embodiment, the image sensor can read at either the reading resolution of 300 dpi or 600 dpi.

When the reading is performed at 300 dpi, the controller 10 acquires the size of the original in the first direction $D_1$. Specifically, the controller 10 acquires the reading start position and the reading completion position of the original in the first direction $D_1$, and determines whether or not the reading completion position is on the $T_1$ side from the position $L_2$. When the reading completion position is on the $T_1$ side from the position $L_2$ (second case), the controller 10 performs the reading at the reading speed $V_1$. Since the reading completion position is on the $T_1$ side from the position $L_2$, the carriage CR can be stopped by the movement limit position $L_1$ by decelerating the carriage CR from the reading completion position according to a predetermined deceleration procedure.

When the reading is performed at 300 dpi and the reading completion position is on the $T_2$ side from the position $L_2$ (first case), the controller 10 performs the reading at a reading speed $V_2$ lower than the speed $V_1$. The braking distance when the reading is performed at the speed $V_2$ is shorter than the braking distance when the reading is performed at the speed $V_1$. In the present embodiment, when the reading is performed at the speed $V_2$, the carriage CR can be stopped by the movement limit position $L_1$ by decelerating according to the predetermined deceleration procedure from the speed $V_2$ if it is up to the reading limit position $L_3$, even if the original is longer than the length from the reading startable position SP to the position $L_2$.

When the reading is performed at 600 dpi, in the present embodiment, the reading is performed at a reading speed $V_3$ lower than the speed $V_1$. Since the speed $V_3$<the speed $V_1$, the braking distance when the reading is performed at 600 dpi (speed $V_3$) is shorter than the braking distance when the reading is performed at 300 dpi (speed $V_1$). In the present embodiment, when the reading is performed at 600 dpi (speed $V_3$), both an original shorter than the length from the reading startable position SP to the position $L_2$ and an original (an original up to the reading limit position $L_3$ on the $T_2$ side from the position $L_2$) longer than the length from the reading startable position SP to the position $L_2$ can be read at the same speed $V_3$. In addition, if it is up to the reading limit position $L_3$, the carriage CR can be stopped by the movement limit position $L_1$ by deceleration according to the predetermined deceleration procedure from the speed $V_3$.

In the present embodiment, the speed $V_3$ is slower than the speed $V_2$. That is, in the present embodiment, $V_1 > V_2 > V_3$, and it is possible to perform the reading by using three different speeds according to the combination of the reading resolution and the original size. In general, when 300 dpi is selected as the reading resolution, high-speed reading is expected. Since the reading speed $V_2$ is faster than the reading speed $V_3$, the original can be read in a shorter time than when the original is read at 600 dpi when the reading is performed at 300 dpi and the reading of a large-sized original (the reading completion position is on the $T_2$ side from the position $L_2$) is performed.

As described above, in reading at 300 dpi, the determination condition for switching the reading speed between $V_1$ and $V_2$ is the size of the original in the first direction $D_1$. The determination is made independently of the size of the original in the second direction $D_2$ orthogonal to the first direction $D_1$. Therefore, the controller 10 reads the original while moving the carriage at a speed that does not depend on the size of the original in the second direction $D_2$.

In addition, when the carriage CR is caused to read a first original over a first time and the carriage CR is caused to read a second original over a second time, the first direction of the first original is A times (A>1) larger than the first direction of the second original, and the first time is a time that exceeds A times of the second time. For example, consider a case where an original (second original) of an A4 size and an original (first original) of a legal size are read at 300 dpi. The size of the long side of the original (first original) of the legal size is A times (A>1) larger than the long side of the original (second original) of the A4 size.

Assuming that a length of the long side of the original of the A4 size is K and a length of the long side of the original of the legal size is AK. The movement time of the carriage CR for reading when these originals are mounted on the original platen T so that the long side is parallel to the first direction $D_1$ and the short side is in contact with the reading startable position SP is set to the first time for the original (first original) of the legal size and the second time for the original (second original) of the A4 size. Since the original (second original) of the A4 size is read by moving the carriage CR at the reading speed $V_1$, the second time is $K/V_1$. Since the original (first original) of the legal size is read by moving the carriage CR at the reading speed $V_2$, the first time is $AK/V_2$. Therefore, the first time is $A(V_1/V_2)$ times longer than the second time. Since $V_1 > V_2$, the first time is a time that exceeds A times of the second time. In the present embodiment, the original (first original) of the legal size is an original having a maximum size that can be read by the scanner 1.

As described above, according to the present embodiment, when an original size (for example, A4 size) which is assumed to be used relatively frequently is read at 300 dpi, high-speed reading is possible. In addition, it is also possible to read an original having a longer side than A4, such as the legal size. In the case of such a large original, the carriage CR is prevented from coming into contact with the housing by reading at a reading speed lower than that of A4 (however, faster than the reading speed of 600 dpi) even when reading at 300 dpi. Therefore, an increase in the housing size can be suppressed.

(2) Scan Processing

FIG. 3 is a flowchart illustrating scan processing. The scan processing is started when a scanning start instruction is acquired from the PC 2. When the scan processing is started, the controller 10 acquires a reading setting (step S100). That is, the controller 10 acquires reading settings such as information indicating a reading range, color/monochrome selection, and reading resolution (300 dpi or 600 dpi) based on information indicating reading conditions.

Subsequently, the controller 10 sets a reading speed according to the reading setting (step S105). That is, the controller 10 selects a speed $V_1$ as the reading speed when the reading resolution is 300 dpi, and selects the speed $V_3$ as the reading speed when the reading resolution is 600 dpi. Subsequently, the controller 10 determines whether or not the reading resolution is 300 dpi (step S110). When it is determined in step S110 that the reading resolution is 300 dpi, the controller 10 determines whether or not a reading range exceeds a range that can be read at the speed $V_1$ (step S115). That is, the controller 10 determines whether or not a reading completion position exceeds the position $L_2$.

When it is determined in step S115 that the reading range exceeds the range that can be read at the speed $V_1$, the controller 10 changes the reading speed (step S120). That is, the controller 10 selects the speed $V_2$ as the reading speed. After executing step S120, or when it is not determined in step S110 that the reading resolution is 300 dpi, or when it is not determined in step S115 that the reading range exceeds the range that can be read at the speed $V_1$, the controller 10 performs the scan processing (step S125). That is, the controller 10 moves the carriage CR from the home position HP to the reference plate 21 to read the reference plate 21, accelerates the carriage CR to the selected reading speed described above between the reference plate 21 and the reading start position, maintains the reading speed from the reading start position to the reading completion position and moves the carriage CR to cause the image sensor to read, and decelerates the carriage CR until it stops according to a predetermined deceleration procedure when the reading is completed at the reading completion position.

(3) Other Embodiments

The above embodiment is an example for carrying out the present disclosure, and various other embodiments can be adopted. For example, the present disclosure is also applicable to a multifunction device provided with a flatbed scanner. When the present disclosure is applied to the multifunction device, the present disclosure can be applied to all jobs for reading (for example, scan job, copy job, fax transmission job, etc.). Therefore, the scan data may be used in various aspects, may be stored in a recording medium (not illustrated) included in the scanner 1, may be stored in a portable recording medium, may be transmitted to an external device, may be used for printing, or may be faxed.

The color of the light source and the mode of the image sensor are not limited to the above-described embodiment, and various combinations can be adopted. Either a method of sequentially switching and reading light sources of RGB or a method of reading using a white light source may be used, a reduction optical method may be used as a CIS method, or a CCD sensor or a MOS sensor may be used.

As a combination of the original size in the first case and the original size in the second case, the combination of legal and A4 is used as an example in the above embodiment, but other combinations may be used as an example. For example, the original size in the first case may be an A4 size, and the original size in the second case may be a letter size (a long side is shorter than the long side of A4), or the original size in the first case may be a B0 size and the original size in the second case may be an A0 size. In addition, when an arbitrary range in the original is read, even if the original size and the orientation when mounted are the same, the present disclosure can be applied to various modes of reading in which the reading completion position in the first direction is closer to the reading limit position $L_3$ in the first case than in the second case. Further, in a third case of reading an original smaller than the second case, the size of the original and the reading speed may be associated with each other in three or more steps, such as setting a reading speed higher than that of the second case.

A distance from a white reference position to the original may be longer than the distance from the original to the wall of the housing on a terminal side in the first direction in the first case. For example, it is assumed that the length of the original in the first direction $D_1$ in the first case is the same as the length of the readable range in the first direction $D_1$ indicated by the alternate long and short dash line. The wall of the housing on the terminal side in the first direction is the wall of the housing of the scanner 1. An inner wall surface H of the housing is located to be separated from the movement limit position $L_1$ by a slight margin. In this case, a distance $K_3$ (distance from the white reference position to the original) from the reference plate 21 to the reading startable position SP may be configured to be longer than a distance $K_4$ (distance from the original to the wall at the end in the first direction) from the reading limit position $L_3$ to the inner wall surface H. Specifically, the distance $K_3$ from the reference plate 21 to the reading startable position SP is a distance required for acceleration to the reading speed and is a distance required for acceleration to the reading speed and constant speed movement at the reading speed (because the reading speed needs to be stable by SP). For example, when accelerating from the reference plate 21 with the same initial speed, acceleration, or the like, the second case (reading speed $V_1$) requires a longer distance to accelerate to the reading speed than the first case (reading speed $V_2$). For that reason, the distance from the reference plate 21 to the reading startable position SP is designed to satisfy at least the distance required for acceleration in the second case. The carriage CR starts accelerating the reference plate 21 at a predetermined initial speed, accelerates to a speed $V_1$ by the reading startable position SP by a predetermined acceleration procedure to shift to a constant speed, and reaches the reading startable position SP. The distance $K_2$ from $L_3$ to $L_1$ is the braking distance required from the speed $V_2$ to the stop (because it is the first case), and the distance $K_4$ from $L_3$ to the inner wall surface H is a distance obtained by adding a slight margin to the braking distance $K_2$. The speed $V_2$ is slower than the speed $V_1$. In addition, there is no need for a distance to stabilize the speed (or even if it is necessary, it is shorter than when accelerating), like acceleration with a read operation later. For that reason, the distance $K_4$ from the reading limit position $L_3$ to the inner wall surface H can be configured to be shorter than the distance $K_3$ from the reference plate 21 to the reading startable position SP.

The home position of the carriage may be on the $T_2$ side of the original platen. In this case, it is conceivable to move the carriage to the $T_1$ side of the original platen and then start reading the original.

The scanner may be configured to read at a plurality of resolutions, or may be configured to read at a single resolution. In the former case, the reading may be performed at three or more resolutions. When the reading can be performed at the plurality of resolutions, the scanner may be configured to change the reading speed according to an original size when reading at any resolution, and may be configured to change the reading speed according to an original size when reading at all resolutions.

When the carriage CR is caused to read a first original over a first time and the carriage is caused to read a second original over a second time, the flatbed scanner may read originals of different sizes so that the first direction of the first original is A times (A>1) larger than the first direction of the second original, and the first time is the time that exceeds A times of the second time. In this case, the first original may be the largest original that can be read by the flatbed scanner. At least the original of the maximum size may satisfy the above relationship. Therefore, the above relationship may be satisfied with an original other than the original of the maximum size.

Further, the present disclosure is also applicable as a program or method executed by a computer. In addition, the system, program, and method as described above may be realized as a single device or may be realized by using parts provided by a plurality of devices, and include various aspects. In addition, the system, program, and method as described above can be changed as appropriate, such as part thereof being software and part thereof being hardware. Further, the disclosure is also established as a recording medium for a program that controls a system. The recording medium of the program may be a magnetic recording medium or a semiconductor memory, and any recording medium to be developed in the future can be considered in exactly the same way.

What is claimed is:

1. A flatbed scanner comprising:
    a carriage configured to read an original while moving in a first direction; and
    a processor configured to control the carriage to read a first original over a first time and configured to control the carriage to read a second original over a second time, wherein
    the first original has a size in the first direction that is A times (A>1) a size of the second original in the first direction,
    the first time is more than A times the second time, and
    a braking distance of the carriage in a second case, which is a case of reading the second original, is longer than a distance between an original of a maximum readable size and a movable terminal of the carriage.

2. The flatbed scanner according to claim 1, wherein
    the first original is a largest original that is read by the flatbed scanner.

3. The flatbed scanner according to claim 1, wherein
    the carriage is configured to read the original at a first resolution and a second resolution lower than the first resolution,
    the processor is
        configured to control the carriage to read the first original over a third time and control the carriage to read the second original over a fourth time when reading at the first resolution, and
        configured to control the carriage to read the first original over the first time and control the carriage to read the second original over the second time when reading at the second resolution, and
    the third time is A times the fourth time.

4. The flatbed scanner according to claim 1, wherein
    the processor is configured to read the original while moving the carriage at a time that does not depend on a size of the original in a second direction orthogonal to the first direction.

5. The flatbed scanner according to claim 1, wherein
    a distance from a white reference position to the original is longer than a distance from the original to a wall of a housing on a terminal side in the first direction in a first case, which is a case of reading the first original.

6. A method for producing scan data using the flatbed scanner according to claim 1, the method comprising:
    controlling the carriage to read a predetermined original over a predetermined time; and
    generating the scan data based on a read result, wherein
    when the predetermined original is the first original having the size in the first direction that is A times (A>1) the size of the second original in the first direction, the predetermined time is more than A times the second time, which is a time taken to read the second original, and
    when the predetermined original is the second original, the predetermined time is less than 1/A times the first time, which is a time taken to read the first original.

* * * * *